July 11, 1967
R. D. LOWRY ETAL
3,330,366
PORTABLE TUBE END CUTTING TOOL
Filed April 29, 1965
3 Sheets-Sheet 1
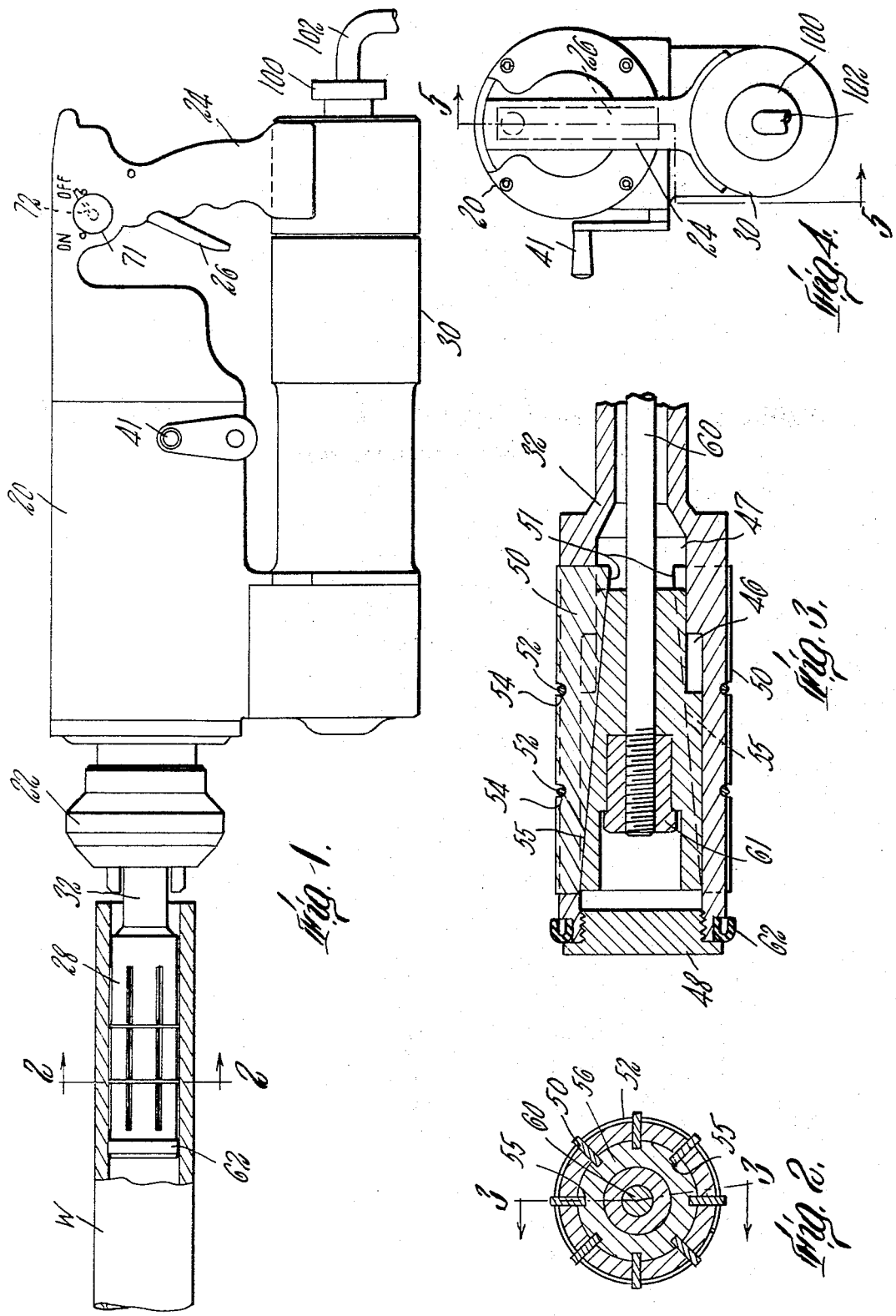

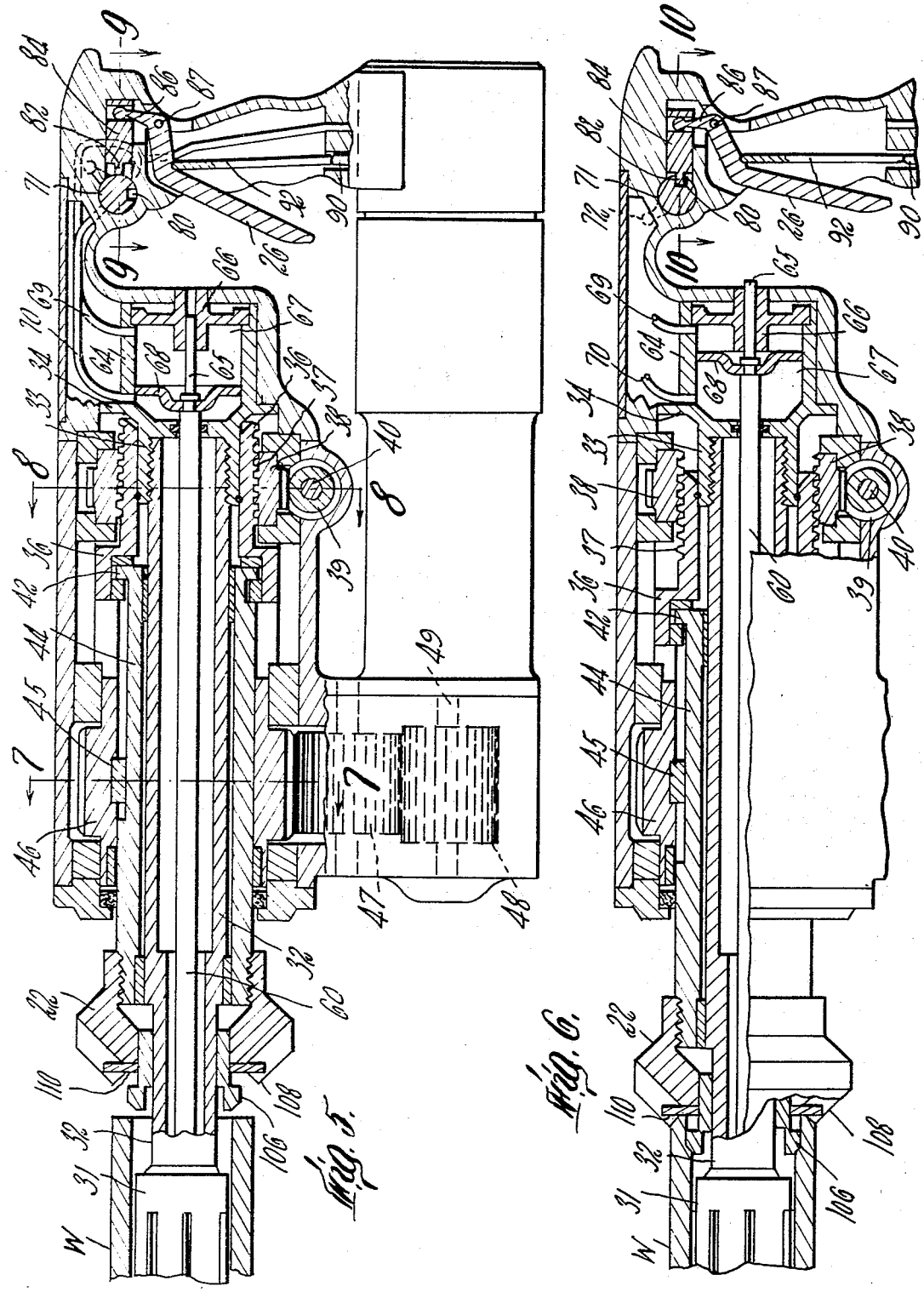

United States Patent Office 3,330,366
Patented July 11, 1967

3,330,366
PORTABLE TUBE END CUTTING TOOL
Robert D. Lowry and Russell B. Strout, Winchester, Mass., assignors to Lowry Development Corporation, Winchester, Mass., a corporation of Massachusetts
Filed Apr. 29, 1965, Ser. No. 451,797
3 Claims. (Cl. 173—33)

ABSTRACT OF THE DISCLOSURE

A portable cutting tool for operating on the ends of tubing has an expansible chuck for holding a work-piece and a rotary cutter head which can be moved towards and away from the chuck. The chuck is operated by a pneumatic motor mounted on the other side of the cutter head from the chuck and connected to one of the elements of the chuck by a pull rod which extends through the rotary cutter head without changing the spacing between the cutter head and the chuck. Another pneumatic motor rotates the cutter head. Air lines are provided for connecting the two pneumatic motors to a common source of air under pressure and the tool is provided with an air line valve interlock system which permits the cutter head motor to rotate the cutter head only when the chuck motor has retracted the pull rod to expand the chuck upon work to be operated upon. In the embodiment described, the cutter head is moved towards and away from the chuck by manual means.

---

This invention relates to a portable cutting tool for preparing the ends of metal pipe or tubing for welding, and more specifically, to a power driven tool having improved means for positioning and holding the work during the cutting operation, together with an interlock system for preventing power rotation of the cutting edges except when the work-holding means is in work-holding position.

Tools of this invention have a cutter head movable towards and away from a chuck, together with means manipulatable from the other side of the cutting head from the chuck for moving chuck parts from work-loading to work-gripping position without changing the relative spaced apart positions of the chuck and cutting head. In addition, the chuck part moving means is such as to permit power operation thereof, utilizing the same source of power as is utilized for driving the tool cutting edges.

It will thus be understood that one object of the invention is to provide more convenient and less time-consuming work-positioning and more reliably precise holding of the workpiece during the cutting operation.

It is a further object of the invention to interlock the power drive for the chuck to the power drive of the rotary cutting head so that the latter operation can take place only when the chuck mechanism is in work-gripping position.

A further object of the invention is to provide in such tools a chuck structure which, by simple replacement of wedge plates, can accommodate tubes of varying internal diameters.

Tools of this invention, like previous tools, have a manually operated crank for advancing the rotating cutting head, with respect to its casing, towards the chuck during the cutting operation, but unlike previous tools, combine an expansible internal rigidly gripping chuck which is in axially fixed relation to the cutting tool casing with chuck expanding means which are manipulatable from behind the cutting head, thus permitting use of a common source of power for both the chuck gripping operation and rotation of the cutting edges.

The structure for accomplishing the above and other objectives of the invention is shown in the accompanying drawings wherein:

FIG. 1 is an elevational view of a cutting tool of the invention showing a workpiece positioned on the chuck;

FIG. 2 is a cross-sectional view taken along the line 2—2 of FIG. 1;

FIG. 3 is an enlarged cross-sectional view of the chuck shown in FIG. 1;

FIG. 4 is an end elevational view of the tool shown in FIG. 1;

FIG. 5 is a cross-sectional view taken along the line 5—5 of FIG. 1 showing the tool parts in chuck-contracted position;

FIG. 6 is a view similar to that shown in FIG. 5 with the chuck in expanded operating position;

Figure 7:
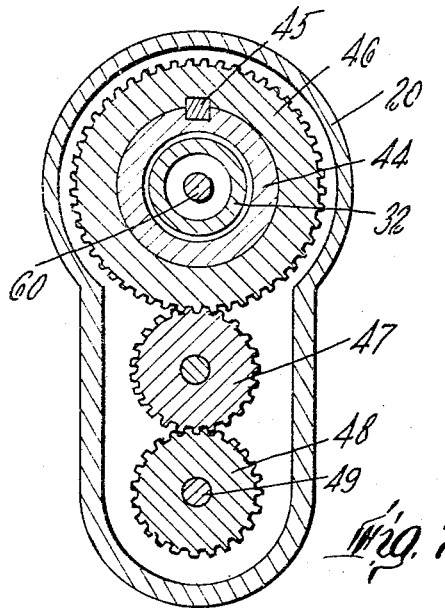
FIG. 7 is a cross-sectional view taken along the line 7—7 of FIG. 5.
Figure 8:
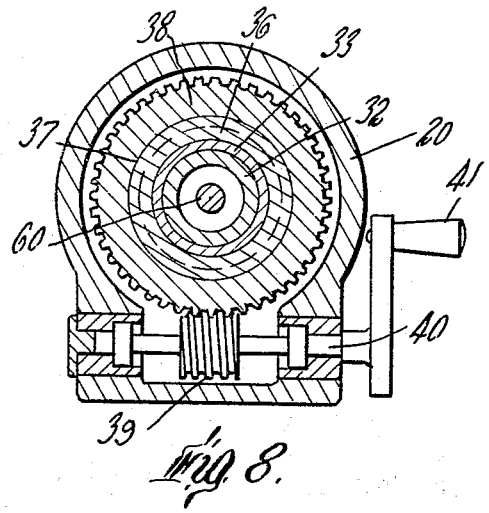
FIG. 8 is a cross-sectional view taken along the line 8—8 of FIG. 5.
Figure 9:
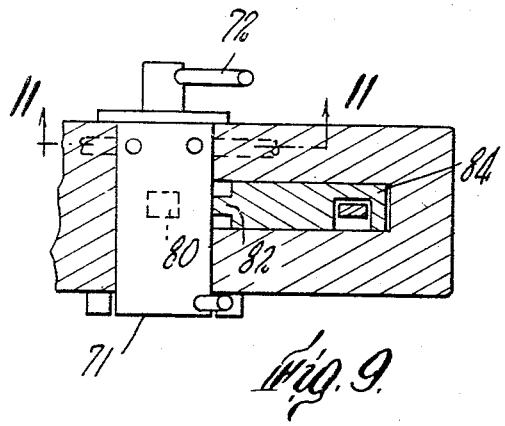
FIG. 9 is a cross-sectional view of the valve mechanism included in the handle of the cutting tool taken along the line 9—9 of FIG. 5.
Figure 10:
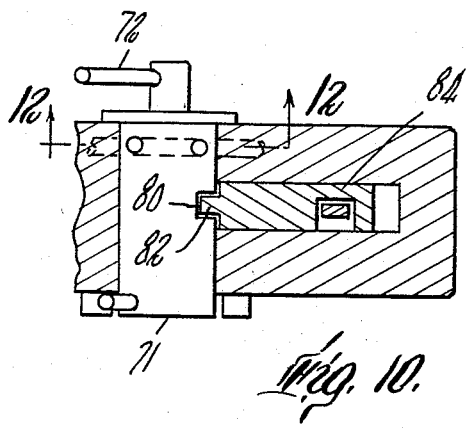
Figure 11:
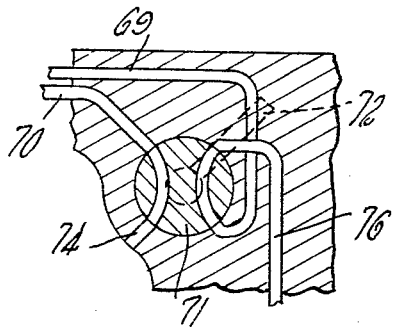
Figure 12:
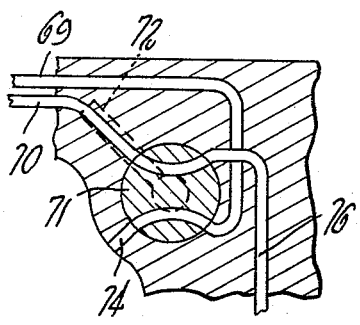

FIG. 10 is a similar view to that of FIG. 9 with the valve in a different position taken along the line 10—10 of FIG. 6; and FIGS. 11 and 12 are sectional views taken along the lines 11—11 of FIG. 9 and 12—12 of FIG. 10, respectively.

In FIG. 1, 20 indicates a casing supporting a rotary cutter head 22, handle 24, squeeze type operating lever 26, chuck 28, workpiece W and air motor 30 for rotating the cutter head 22.

The cutter casing 20 and the supporting shell 31 for the movable parts of chuck 28 are stationary with respect to each other, the shell being formed, as shown in FIGS. 5 and 6, as an integral part of a hollow shaft 32 which extends into casing 20 and has its right hand end screwed into a hub 33 of a cross head 34 held fast to casing 20.

The mechanism for rotating and moving the cutter head 22 axially with respect to casing 20 and towards and away from the chuck shell 31 includes a sleeve 36 mounted around the outside of the hub 33. The outside surface of the sleeve 36 is threaded at 37 to engage a surrounding gear 38 mounted for rotation through its engagement with a worm gear 39 mounted on a shaft 40 extending through the casing and terminating in a hand crank 41.

The forward end of sleeve 36 (FIG. 5) has a configuration which interlocks it against relative axial, but not relative rotary, movement with respect to rotatable drive sleeve 44 keyed by key 45 to a gear 46 which meshes with gears 47 and 48 driven from a drive shaft 49 protruding from the air motor 30 (FIG. 5).

Cutter head 22 thus has rotary motion with respect to the casing 20 and may be moved axially back and forth with respect to the casing 20 and the shell 31 of the chuck by reason of the engagement of its rear end rotatably with the axially movable sleeve 36.

The chuck parts are shown most clearly in FIGS. 2 and 3. As shown, the forward enlarged shell-forming end of shaft 32 has an outer enlarged bore 46 which steps down into an intermediate bore 47. The outer end of shell 31 is covered by a screw-threaded cap 48.

The circumferential surface of shell 31 surrounding the bores 46 and 47 is provided with a multiplicity of radial slits for the edgewise reception of a series of rigid plates 50 so that shell 31 acts as a squirrel cage. The internal edges 51 of plates 50 are wedge-shaped and, under the influence of annular coil spring elastic bands 52 seated in grooves 54 of the wedge plates 50, bear against tapered surfaces 55 forming the bottoms of registering slots in an internal cylindrical head 56 which is fitted into the bores 46 and 47 for reciprocal movement. The head 56 is held fast on the reduced end of a pull rod 60 by nut 61.

When the pull rod 60 is pulled to the right, as shown in FIG. 3, the tapered surfaces 55 of the head 56 will cause the wedge plates 50 to move radially outwardly in their slits to increase the chuck diameter and internally engage a surrounding workpiece W. A U-seal rubber ring 62 surrounds the outer end of the hollow shaft 32 to seal a surrounding workpiece W to prevent shavings or chips from going into the pipe and to clean them out of the end of the pipe as it is withdrawn from the chuck.

Pulling means for pulling the rod 60 is shown in FIGS. 5 and 6 and includes a pneumatic motor casing 64 attached to the back of cross head 34. The pull rod 60 passes through cross head 34 and has a reduced end portion thereof 65 seated in a bore in hub 66 fast on the casing 20. When rod 60 is retracted, its end protrudes through the bore so that it can be hit if the chuck becomes jammed.

The rod 60 carries within the chamber 67 formed by the motor casing 64, a piston 68 sectionalizing the chamber 67. Two air supply lines 69 and 70 are provided, one, 69, communicating with the rear motor chamber and the other, 70, with the front motor chamber. These lines run to a rotatable 4-way rotary valve 71 seated in the handle 24 and having hand levers 72 (FIGS. 9–12) to rotate valve 71 from the OFF position shown in FIGS. 5, 9 and 11 wherein the line 70 is placed in communication with an exhaust at 74, and line 69 is simultaneously connected to a duct 76 leading from a source of air pressure, to the ON position shown in FIGS. 6, 10 and 12 wherein the line 70 is connected to the air supply line 76 and the line 69 is connected to the exhaust 74.

The valve 71, when in the OFF position of FIGS. 5, 9 and 11, will therefore cause the rod 60 to extend from casing 20; whereas when the valve is hand turned to the ON position shown in FIGS. 6, 10 and 12, the front chamber of the motor is placed under air pressure to retract the rod 60 into the casing 20 and cause expansion of the wedge plates 50 against the resilience of the elastic coil springs 52.

An interlock is provided by reason of the presence of a recess 80 in the external surface of cylindrical valve 71, which recess 80 moves from the position shown in FIG. 5 facing downwardly to the position shown in FIG. 6 facing rearwardly by reason of a quarter-turn of the valve 71 from OFF to ON position, bringing it into alignment with a sliding pin 82 protruding from the end of a slide 84 which is engaged by an extension 86 connected to the squeeze handle 26 on the other side of its pivot pin 87. The squeeze handle 26, therefore, may not be moved rearwardly while the valve 71 is in the OFF position of FIG. 5, but can be moved rearwardly when the valve 71 is in the ON position of FIG. 6. Since the air line to the rotary cutter head motor 30 has a spring closed valve stem 90 which can be depressed by a rod 92 connected to the squeeze handle 26, it will be seen that the air motor 30 cannot be actuated except when valve 71 is in the ON position, that is, when the chuck is in expanded work-engaging position. The handle 26 also operates as a dead man's throttle, valve stem 90 closing the air valve to motor 30 whenever squeeze pressure on handle 26 is released.

To operate the device, it is first connected through coupler 100, shown in FIG. 1, to a flexible hose line 102 communicating with a source of air under pressure. Workpiece W is placed over chuck 28 while it is in radially contracted position with the lever 72 in OFF or rear position. Lever 72 is moved to ON or forward position to clamp the workpiece W. The squeeze handle 26 may then be moved rearwardly to start the air motor to rotate the cutting head 22. The hand crank 41 is then turned to bring the cutter head 22 into engagement with the workpiece and move it continually towards the workpiece as the cutting proceeds.

When the cutting operation is finished, the squeeze handle 26 is let go to stop the rotation of the cutter head. The crank 41 is backed off and then the chuck control lever 72 is moved from ON forward to OFF rearward position to release the chuck wedges 53, whereupon the workpiece may be removed from the chuck.

As can be seen, if work of different internal diameter is to be cut, the expanded radius of the chuck can be readily changed by removing the elastic bands 52 and substituting for each of the identical wedge plates 50, other plates having slightly less or slightly greater radial depth of accommodate smaller or larger internal diameter workpieces.

While three sets of cutting edges, 106, 108 and 110, are shown mounted on the cutter head 22, the precise form of cutting edges forms no part of this invention and hence need not be further described.

There is thus provided a compact portable tool which can be operated from a source of air under pressure providing both power driven chuck operation and power driven cutting edge operation and having a chuck which provides solid support and precise alignment and has a fixed axial spacing from the casing with respect to which the cutter head is rotated and moved axially, and with the operation of the contraction and expansion of the chuck being entirely independent of the exact location of the cutting head between the chuck and the casing.

In addition, the interlock described provides a safety device to prevent inadvertent engagement of the work with a rotating cutter head prior to its firm engagement by the chuck.

What is claimed is:

1. A tube end cutting tool comprising an expansible chuck, a rotary cutter head mounted in opposed spaced relation to said chuck for movement towards and away from said chuck, means for moving said cutter head towards and away from said chuck, a pneumatic motor, independent of said cutter head moving means, mounted behind said cutter head, a pull rod extending through said rotary cutter head and connecting said motor to expansible parts of said chuck, for expanding said chuck while maintaining the spacing between said cutter head and said chuck unchanged, a separate pneumatic motor for rotating said cutter head, air lines for supplying air to both said pneumatic motors from a common source of air under pressure, manually operable valve means interposed in said air lines to open and close said air lines and means cooperating with the valve means in said pull rod motor air supply line to prevent opening of the valve means in said cutter head motor air supply line except when said pull rod motor valve is set to retract said pull rod to expand said chuck.

2. A tube end cutting tool comprising a casing, an annular cutting head extending from one end of said casing and mounted for axial and rotary movement relative to said casing, a hollow chuck-supporting shaft mounted in fixed relation to said casing and extending outwardly through and beyond said annular cutter head, a pull rod slidingly mounted within said shaft for sliding reciprocal motion relative to said casing, cooperating means on the respective ends of said shaft and said rod forming an expansible chuck for internally gripping a tube positioned over said chuck when said rod is moved towards said casing, a pneumatic motor for rotating said cutting head, a separate pneumatic motor for pulling said pull rod towards said casing to expand said expansible chuck, air supply lines for connecting both said motors to a common source of air underpressure, manually operable valve means interposed in said air lines to open and close said air lines and means cooperating with the valve means in said pull rod motor air supply line to prevent opening of said cutter head motor valve means except when said pull rod motor valve is set to retract said pull rod towards said casing.

3. A tube end cutting tool as claimed in claim 2 having, additionally, manual means for moving said cutting head axially with respect to said casing towards and away from said chuck.

References Cited

UNITED STATES PATENTS

| | | | |
|---|---|---|---|
| 399,317 | 3/1889 | Diggs | 173—148 |
| 2,213,379 | 9/1940 | Bird et al. | 279—2 |
| 2,746,497 | 5/1956 | Thompson | 279—2 |
| 3,059,514 | 10/1962 | Lindemann | 279—2 |
| 3,086,783 | 4/1963 | Kelso | 279—2 |
| 3,141,510 | 7/1964 | Lawrence | 172—33 |
| 3,149,682 | 9/1964 | Dunston | 173—148 |
| 3,227,483 | 1/1966 | Guild et al. | 294—96 |

FRED C. MATTERN, JR., *Primary Examiner.*

L. P. KESSLER, *Assistant Examiner.*